United States Patent
Kim

(10) Patent No.: US 9,215,549 B2
(45) Date of Patent: Dec. 15, 2015

(54) METHOD FOR DELIVERING MACHINE TO MACHINE (M2M) APPLICATION CONTROL DATA OVER CONTROL PLANE IN LTE/EPS UTILIZING STANDARD BEARER MANAGEMENT PROCEDURES

(71) Applicant: Aeris Communications, Inc., Santa Clara, CA (US)

(72) Inventor: Dae Seong Kim, Campbell, CA (US)

(73) Assignee: AERIS COMMUNICATIONS, INC., Santa Clara, CA (US)

( * ) Notice: Subject to any disclaimer, the term of this patent is extended or adjusted under 35 U.S.C. 154(b) by 340 days.

(21) Appl. No.: 13/766,265

(22) Filed: Feb. 13, 2013

(65) Prior Publication Data

US 2014/0226470 A1    Aug. 14, 2014

(51) Int. Cl.
*H04W 4/00*    (2009.01)
*H04W 28/02*    (2009.01)

(52) U.S. Cl.
CPC .......... *H04W 4/005* (2013.01); *H04W 28/0268* (2013.01)

(58) Field of Classification Search
None
See application file for complete search history.

(56) References Cited

U.S. PATENT DOCUMENTS

| | | | |
|---|---|---|---|
| 6,553,006 B1 | 4/2003 | Kalliokulju et al. | |
| 7,564,776 B2 | 7/2009 | Hermsmeyer et al. | |
| 7,787,492 B2 | 8/2010 | Timus et al. | |
| 8,432,871 B1 | 4/2013 | Sarnaik et al. | |
| 8,565,755 B1 * | 10/2013 | Badakere Ramachandra et al. | 455/424 |
| 2004/0032828 A1 | 2/2004 | Satt et al. | |
| 2007/0169107 A1 | 7/2007 | Huttunen | |
| 2008/0123660 A1 | 5/2008 | Sammour et al. | |
| 2009/0067372 A1 | 3/2009 | Shah et al. | |
| 2010/0124198 A1 * | 5/2010 | Wong | 370/329 |
| 2011/0039526 A1 | 2/2011 | Ait-Ameur | |
| 2011/0063997 A1 | 3/2011 | Gras et al. | |
| 2011/0199905 A1 | 8/2011 | Pinheiro et al. | |
| 2011/0213871 A1 | 9/2011 | DiGirolamo et al. | |
| 2012/0004003 A1 | 1/2012 | Shaheen et al. | |
| 2012/0047551 A1 | 2/2012 | Pattar et al. | |
| 2012/0064878 A1 | 3/2012 | Castro Castro et al. | |
| 2012/0099428 A1 | 4/2012 | Kamdar et al. | |
| 2012/0113937 A1 | 5/2012 | Aramoto et al. | |
| 2012/0117140 A1 | 5/2012 | Wang et al. | |
| 2012/0142306 A1 * | 6/2012 | Shah | 455/404.1 |

(Continued)

FOREIGN PATENT DOCUMENTS

EP    2642817    9/2013

OTHER PUBLICATIONS

Larry Tichavsky Vodafone, "The Rise of the Machine: The Vodafone Global M2M Services Platform, Focus Area: Tomorrow's Technology Today (TTT), Session #: TB015SN", 2013.

(Continued)

*Primary Examiner* — Hong Cho
(74) *Attorney, Agent, or Firm* — Sawyer Law Group, P.C.

(57) ABSTRACT

The present invention relates generally to network communications, and more particularly to machine-to-machine (M2M) data communications. The present invention provides for a method, apparatus and computer program product for allocating and assigning a first APN used in the M2M network which is utilized to provide a M2M control message, to provide satisfactory service levels to a user of the network without overburdening the assigned APN. A control APN approach using M2M control messaging is provided.

29 Claims, 6 Drawing Sheets

(56) References Cited

U.S. PATENT DOCUMENTS

| | | |
|---|---|---|
| 2012/0163369 A1 | 6/2012 | Draznin et al. |
| 2012/0188895 A1* | 7/2012 | Punz et al. ............... 370/252 |
| 2012/0221955 A1 | 8/2012 | Raleigh et al. |
| 2012/0231828 A1 | 9/2012 | Wang et al. |
| 2012/0246325 A1* | 9/2012 | Pancorbo Marcos et al. 709/227 |
| 2012/0257556 A1 | 10/2012 | Jung et al. |
| 2012/0257571 A1 | 10/2012 | Liao |
| 2012/0281530 A1 | 11/2012 | Sambhwani et al. |
| 2012/0281581 A1 | 11/2012 | Liu |
| 2012/0287844 A1 | 11/2012 | Ophir et al. |
| 2012/0287854 A1* | 11/2012 | Xie et al. ............... 370/328 |
| 2012/0307798 A1 | 12/2012 | Zhou et al. |
| 2013/0013741 A1 | 1/2013 | Norp et al. |
| 2013/0013792 A1 | 1/2013 | Norp |
| 2013/0016657 A1* | 1/2013 | Muhanna et al. ............ 370/328 |
| 2013/0017827 A1* | 1/2013 | Muhanna et al. ........... 455/426.1 |
| 2013/0051326 A1 | 2/2013 | Jeyatharan et al. |
| 2013/0077484 A1 | 3/2013 | Zhao et al. |
| 2013/0149987 A1 | 6/2013 | Cheng et al. |
| 2013/0329653 A1 | 12/2013 | Russell, Jr. et al. |
| 2013/0336222 A1 | 12/2013 | Lu et al. |
| 2014/0143390 A1* | 5/2014 | Umapathy et al. ............ 709/221 |
| 2014/0161026 A1 | 6/2014 | Stojanovski et al. |

OTHER PUBLICATIONS

Najah Abu Ali, et al., "Quality of Service in 3GPP R12 LTE-Advanced", IEEE Communications Magazine, pp. 103-109, Aug. 2013.

Puneet Jain, et al., "Machine Type Communications in 3GPP Systems", IEEE Communications Magazine, pp. 28-35, Nov. 2012.

Jussi Marjamaa, "A measurement-based analysis of machine-to-machine communications over a cellular network", Aalto University School of Electrical Engineering, Jan. 6, 2012.

International Search Report and the Written Opinion of the International Searching Authority issued for International Application PCT/US2014/016233, mailed Jun. 13, 2014.

Greg Page, "Designing Security for Mobile Operators", Cisco Networkers, 2007.

* cited by examiner

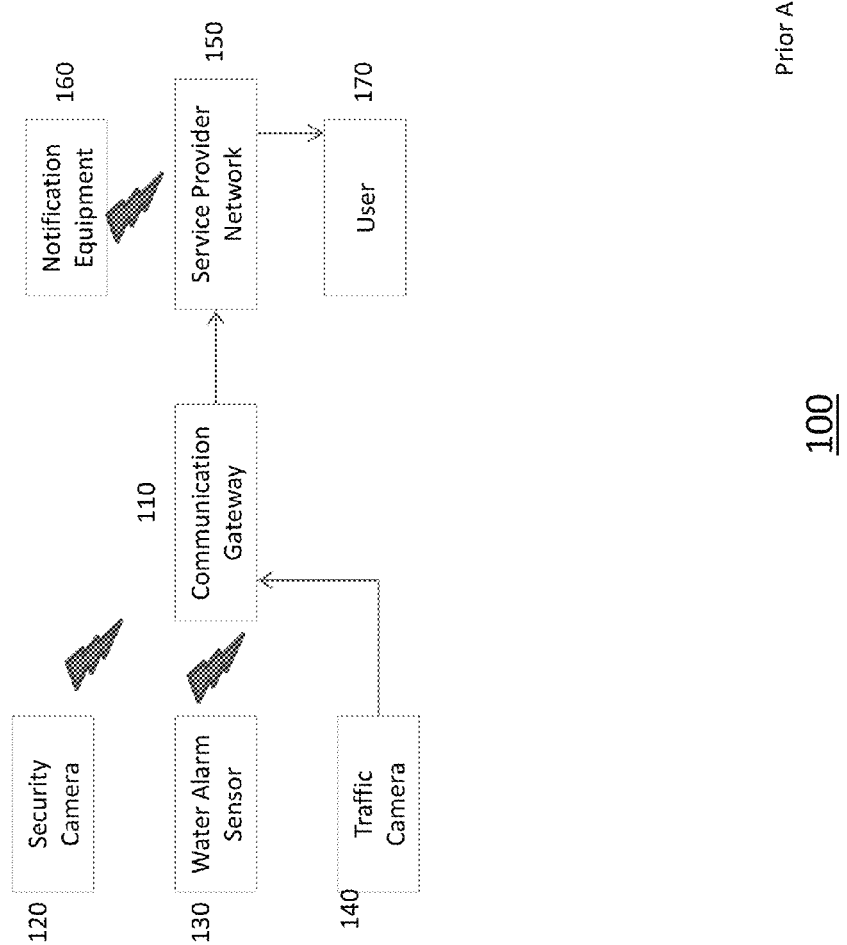

METHOD FOR DELIVERING MACHINE TO MACHINE (M2M) APPLICATION CONTROL DATA OVER CONTROL PLANE IN LTE/EPS UTILIZING STANDARD BEARER MANAGEMENT PROCEDURES

CROSS-REFERENCE TO CO-PENDING RELATED APPLICATION

This application is related to co-owned and co-pending U.S. patent application entitled "LAYERED MACHINE TO MACHINE (M2M) SERVICE METHODOLOGY USING CLASS-BASED ACCESS POINT NAMES (APNS)", filed on Feb. 13, 2013 as U.S. patent application Ser. No. 13/766,113 which is incorporated herein by reference in its entirety.

FIELD OF THE INVENTION

The present invention relates generally to network communications, and more particularly to machine-to-machine (M2M) data communications.

BACKGROUND OF THE INVENTION

Machine to machine (M2M) network communications involve technologies to communicate with other devices often of similar abilities, different from traditional cellular communication networks for instance. In basic M2M environments, a device having limited logic (such as a sensor, meter, etc.) is resident at a location to typically capture measurable event data (such as temperature, pressure, quantity, etc.). The device is connected through a communications network to a remote computer or server having an application layer of specific software. The data received from the device is converted to relevant information associated with the measured event data through the application and may often thereafter undergo analysis or further similar assessment. In many cases a device, when activated, may trigger and communicate the events it is intended for so that those communicated events will then be acted upon by other machines, applications, and/or users on the network.

M2M environments often involve systems of networks, wired and wireless, that are to be connected to the internet and include personal appliances and similar devices. In M2M networks, typically devices maybe stationary or mobile and be connected via wired or wireless access protocols, often through WiFi network protocols or a 3GPP Mobile network protocol. These devices may also have seasonal and/or elastic connectivity needs (e.g., agricultural business needs, store and forward capability). Often in busy M2M networks, there is an 'always on' device being used such as a general packet radio services (GPRS) or internet gateway. However, M2M communication infrastructure remains most suited to the communication needs and patterns of devices having similar abilities, characteristically, for communicating with other systems and devices on the same network.

FIG. 1A depicts a basic M2M communication network 100 having typical sensor-type devices 120, 130 and 140. In FIG. 1A, the M2M network 100 has a central communication gateway 110 in which communications from devices 120, 130 and 140 are linked with a service provider network 150. The linkage may be wired or wireless, and is depicted as the security camera 120 and the water alarm sensor 130 in wireless communication with the gateway 110. Similarly, the traffic camera sensor 140 is in wired communication with the gateway, though one will appreciate that there are many variations to the type and protocol of communication for FIG. 1A.

From FIG. 1A, data sensed and obtained by the devices is transmitted across the M2M network to the service provider network 150 where the data may be shared as raw data or converted to information, often through software applications. Notification equipment 160 wirelessly receives the data from the service provider network 150 and acts in accordance with the received data for the specific event. For instance where the notification equipment is an alert system to send a text to a building owner in the event of a water leak, and the water sensor has sent data indicating a water leak, the notification equipment will then trigger an event to notify the building owner. Similarly, from FIG. 1A, where the user 170 receives a suite of rolling historical data as to traffic camera operation cycles, the user may then act accordingly based on the received cumulative information.

Devices suitable for use with M2M networks often may have multiple access point names (APNs) available for implementation. The APN is the name of a gateway between a GPRS (or 3G, etc.) mobile network and another computer network, which may often be the public Internet for instance. It will be appreciated that APNs are often used in 3GPP data access networks, e.g. general packet radio service (GPRS), evolved packet core (EPC), etc. FIG. 1B sets forth a typical APN format 190 having a network identifier portion (191) and an operator identifier portion (192).

For example, in order for a device to obtain a viable data connection with a carrier, an APN must be configured to present to the carrier. In operation, the carrier will then examine this presented identifier to determine what type of network connection should be created. A carrier may determine in one or more instances for example what IP addresses may be assigned to the device, what security associations should be utilized, etc. Other configurations for an APN for utilization of services may be aligned such as with email, web surfing, custom services, banking services, etc., where each service has its associated APN.

Additionally, the APN identifies the packet data network (PDN), that a mobile data user wants to communicate with. In addition to identifying a PDN, an APN may also be used to define the type of service, (e.g. connection to a wireless application protocol (WAP) server, multimedia messaging service (MMS)), that is provided by the PDN. Often in Long Term Evolution (LTE)/Evolution Packet Systems (EPS) and 2G/3G packet data in general, PDN access service is offered with a fixed number of APNs (typically one) where there is no difference in the offered APNs other than the differing PDN endpoint. For example, LTE is a 4G technology.

FIG. 2 sets forth a typical LTE/EPS architecture 200 for a M2M network. From FIG. 2, User equipment (UE) functions include devices 210 and similar. UE functions include a universal subscriber identity module holding authentication information, provide for supporting LTE uplink and downlink air interface and monitoring radios and conveys performance to the evolved node B (eNB) channel quality indicator—220, 224. The Radio Access Network (RAN) portion includes eNBs 220, 224 and communication with the mobility management entity (MME) function 228.

The eNB functions include radio resource management, radio bearer control, radio admission control, connection mobility control and uplink/downlink scheduling, for example. MME selection is also preferably performed by the eNB functions.

The MME functions 228 include non-access stratum (NAS) signaling, NAS signaling security, signaling for mobility between 3GPP access networks (S3), PDN gateway and serving gateway selection, roaming to home subscriber (HSS) 230, bearer management functions, authentication, etc. The HSS is linked with the MME where the HSS provides for storage of subscriber data, roaming restrictions list, accessible access point names (APNs), subscriber data management, and similar.

Communication from the MME 228 to the serving gateway (S-GW) 232 occurs across the core portion of the network as depicted in FIG. 2, where the S-GW provides for local mobility anchor inter eNB handover (such as from eNB 224), packet routing/forwarding, transport level packet uplinking and downlinking, accounting on user and QoS class identifier granularity for inter-operator charging, uplink and downlink charging per UE, packet data node and QoS class identifier, etc.

Communication between the S-GW and PDN Gateway (P-GW) 234 occurs as depicted in FIG. 2 where the P-GW provides for a PDN gateway, per-user packet filtering, UE internet protocol (IP) address allocation, transport level packet marking for downlinking, uplink/downlink service level charging and rate enforcement, etc. The P-GW communicates with the Public Data Network 248, where for providing data transmission services. The P-GW also communicates with the Policy and charging rules function (PCRF) 236.

The PCRF provides for interfaces and application functions such as proxy-call session control function (P-CSCF), interfaces with the PDN gateway to convey policy decisions to it, treatment of services in the PDN gateway in accordance with a user subscription policy, and similar. The PCRF communicates such information with the applications portions of the network including an IP Multimedia Subsystem (IMS) 240 and through applications 242.

FIG. 3 sets forth an exemplary bearer architecture 300 showing logic relationships across a EUTRAN to EPC to PDN. The EUTRAN is also known as an e-UTRA, being the air interface of 3GPP's Long LTE upgrade path for mobile networks (Evolved UMTS Terrestrial Radio Access Network). From FIG. 3, the EPS bearer is an end-to-end tunnel defined to a specific QoS at 360, where the tunnel traverses UE 310, eNB 320, S-GW 330, P-GW 340 and Peer entity 350. Planes between logic functions such as S1, being a user plane between the eNB and serving gateways, are provided for in FIG. 3 as LTE-UU, S1, S5-S8 (Signaling interfaces), and SGi (interface into the IP PDN). Similarly, the bearer architecture provides for an EPS bearer 362 which has four parameters including a QoS class identifier, allocation and retention policy (ARP), guaranteed bit rate or max bit rate (MBR), and aggregate maximum bit rate (AMBR). An external bearer not having a MBR is provided for at 364. A radio access bearer (E-RAB) 370, S5-S8 bearer 372 and radio bearer 374 are also logically depicted in FIG. 3.

From FIG. 3, logically, each EPS bearer context represents an EPS bearer between the UE and a PDN. EPS bearer contexts can remain activated even if the radio and S1 bearers 376 constituting the corresponding EPS bearers between UE and MME are temporarily released. An EPS bearer context can be either a default bearer context or a dedicated bearer context. A default EPS bearer context is activated when the UE requests a connection to a PDN. The first default EPS bearer context, is activated during the EPS attach procedure. Additionally, the network can activate one or several dedicated EPS bearer contexts in parallel As will be appreciated from FIG. 3, in LTE/EPS networks, one or more bearers are established between the UE and network (EPC) to provide the UE with ready-to-use IP connectivity to the PDN. Typically a bearer is associated with specific QoS, for example, between the UE and the EPC. While the EPS bearer management procedures are defined in 3GPP specifications and references, these procedures are often specifically and purposefully allocated to perform certain unique tasks or communications.

Using the procedures described in the 3GPP specifications prescriptively provides for procedural compliance, such as those of EPS bearer modifications; however, as a result it is possible to inadvertently overload other system constraints I so doing or not achieve objectives needed by a user in other means. For instance, the EPS nearer modifications is a well-known procedure which can be used to deliver M2M control data where a device may be customized by application logic to recognize special application payloads via the procedure. Similarly, the device can transmit special data to the network using the same procedure. Unfortunately, the payload for such is generally small, and as a result the assigned default APN, which provides for guaranteed bit rates (MBRs), may become overloaded where the user's ability to web surf, use email and similar is constrained.

Therefore, what is desired is an approach to intelligently allocate and assign a first APN used in the M2M network which is utilized to provide a M2M control message, to provide satisfactory service levels to a user of the network without overburdening the subscribed APN.

As used herein the terms device, appliance, terminal, remote device, wireless asset, etc. are intended to be inclusive, interchangeable, and/or synonymous with one another and other similar communication-based equipment for purposes of the present invention though one will recognize that functionally each may have unique characteristics, functions and/or operations which may be specific to its individual capabilities and/or deployment.

As used herein the term M2M communication is understood to include methods of utilizing various connected computing devices, servers, clusters of servers, wired and/or wirelessly, which provide a networked infrastructure to deliver computing, processing and storage capacity as services where a user typically accesses applications through a connected means such as but not limited to a web browser, terminal, mobile application (i.e., app) or similar while the primary software and data are stored on servers or locations apart from the devices.

SUMMARY OF THE INVENTION

The present invention fulfills these needs and has been developed in response to the present state of the art, and in particular, in response to the problems and needs in the art that have not yet been fully solved by currently available technologies.

One embodiment of the present invention includes a method for assigning a control Access Point Name (APN) in a machine-to-machine (M2M) network independent of user application level traffic. The method preferably includes assigning the control APN and one or more subscribed APN(s); establishing a default bearer for the control APN; sending M2M control data from a first network point to a second network point; and, receiving the M2M control data at the second point.

Another embodiment of the present invention includes a computer program product stored on a computer usable medium, comprising: computer readable program means for causing a computer to control an execution of an application to perform a method for assigning a control Access Point Name (APN) in a machine-to-machine (M2M) network independent of user application level traffic. The computer product preferably includes assigning the pseudo APN and a subscribed APN; establishing a default bearer for the pseudo APN; sending M2M control data in a first instance from either a user equipment (UE) point to a core network (CORE) or from a CORE to a UE; and, retrieving the sent M2M control data.

The present invention provides an approach to intelligently allocate and assign a first APN used in the M2M network which is utilized to provide a M2M control message, to provide satisfactory service levels to a user of the network without overburdening the subscribed APN. In so doing, the present invention provides for a low-cost M2M control messaging approach independent of user application level traffic.

BRIEF DESCRIPTION OF DRAWINGS

FIG. 1A depicts a basic M2M communication network having typical sensor-type devices;

DETAILED DESCRIPTION OF PREFERRED EMBODIMENTS

The present invention relates generally to network communications, and more particularly to machine-to-machine (M2M) data communications.

The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Mobile devices are able to connect to a M2M network once they are authenticated and authorized. Often a device's credentials or authority is obtained through an authentication; authorization and accounting (AAA) network in communication with the M2M network. Once a device is authenticated and authorized, the device may often be automatically configured with DNS, routing information and an IP address AAA. Similarly, the authentication occurs only where the APN of the device is in alignment with the communication requirements of the M2M network.

Figure 1B:
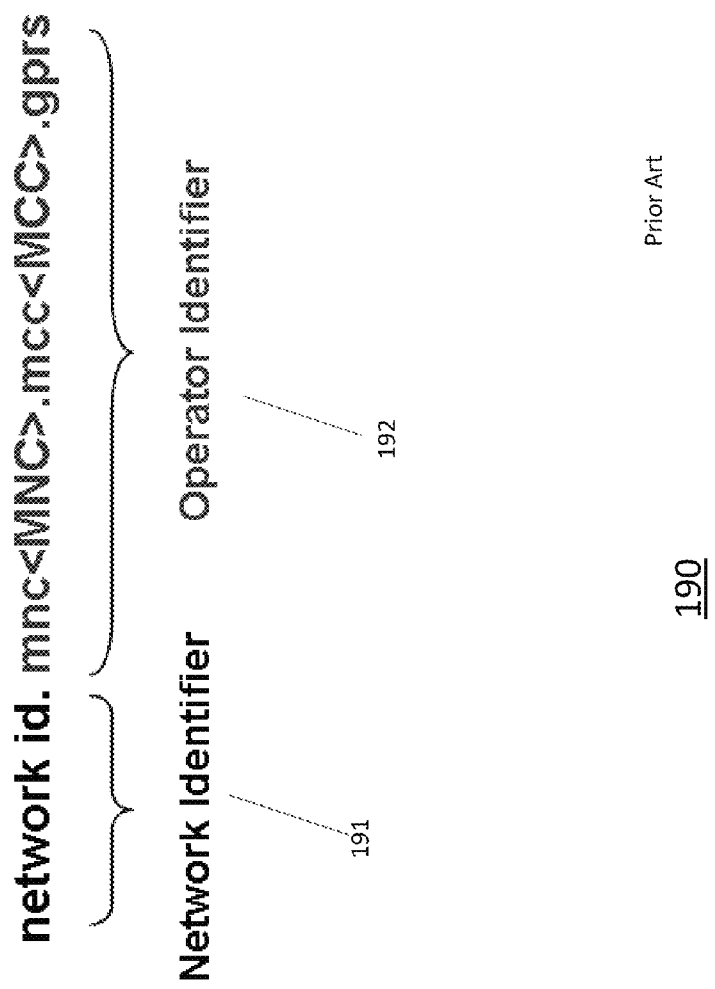
FIG. 1B sets forth a typical APN format having a network identifier portion and an operator identifier portion.
Figure 2:
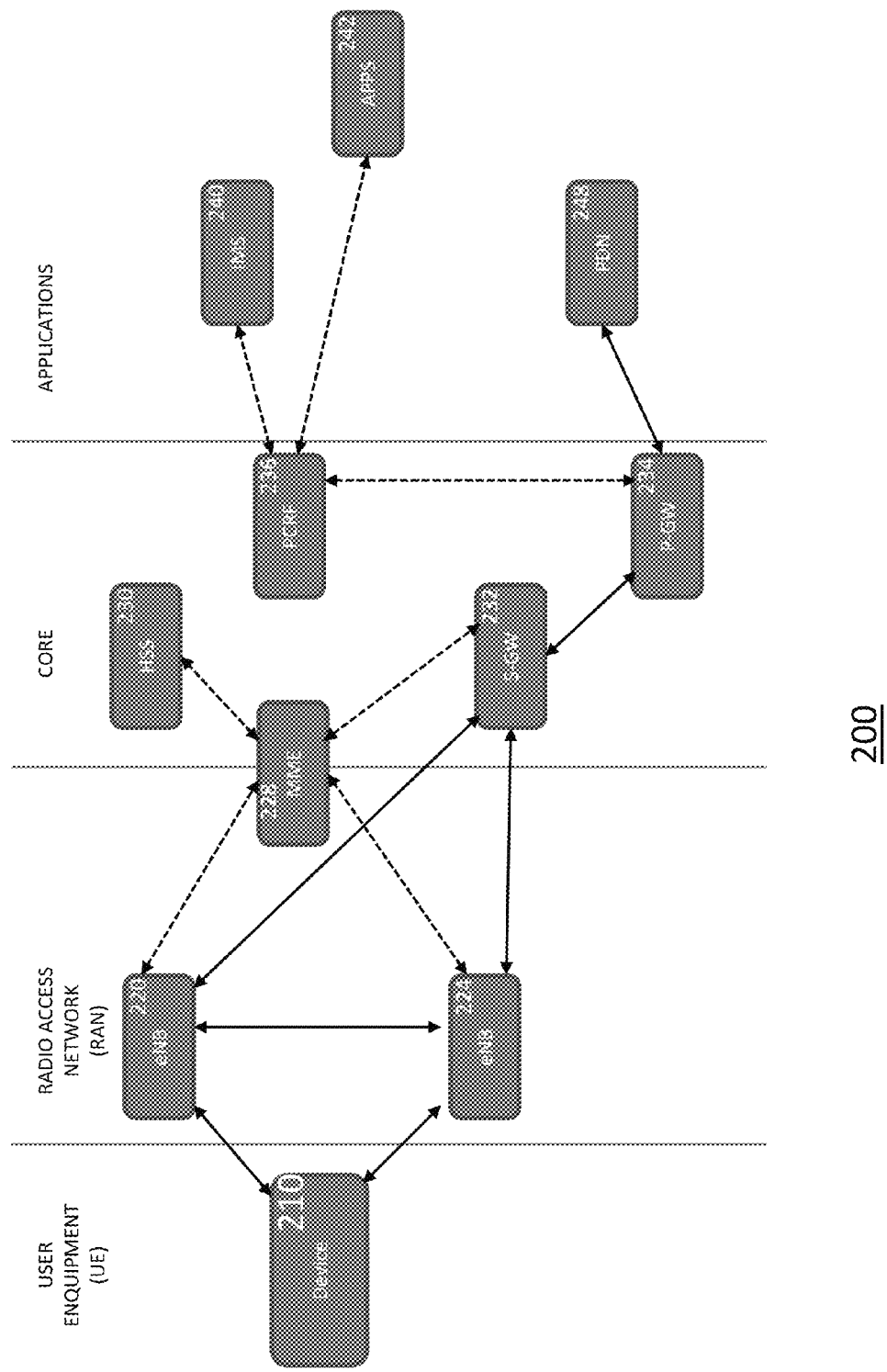
FIG. 2 sets forth a typical LTE/EPS architecture for a M2M network.
Figure 3:
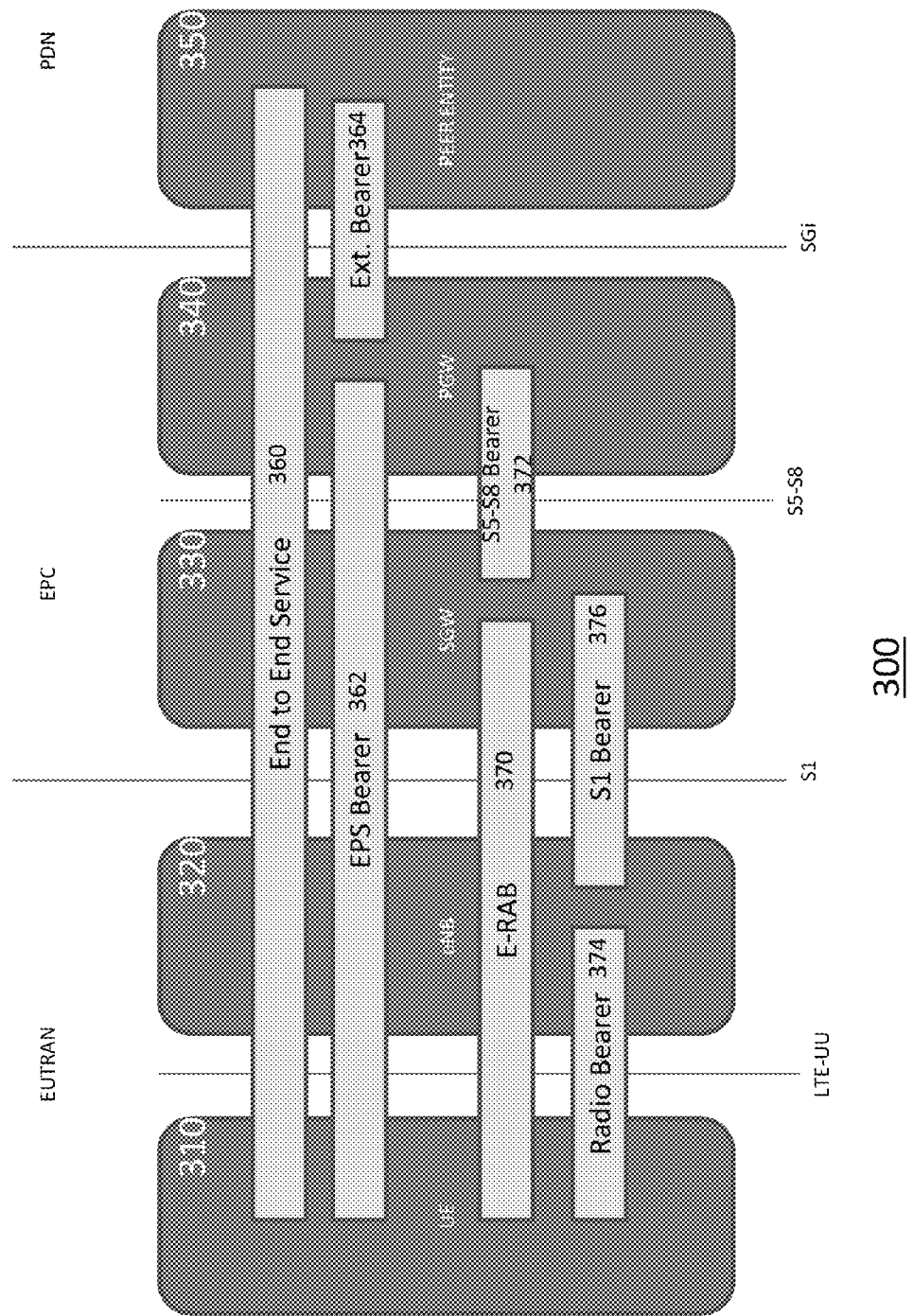
FIG. 3 sets forth an exemplary bearer architecture showing logic relationships across a EUTRAN to EPC to PDN; and, FIG. 4 sets forth one embodiment of the present invention providing for a method for assigning a control Access Point Name (APN) in a machine-to-machine (M2M) network independent of user application level traffic, from the CORE to the UE.
Figure 4:
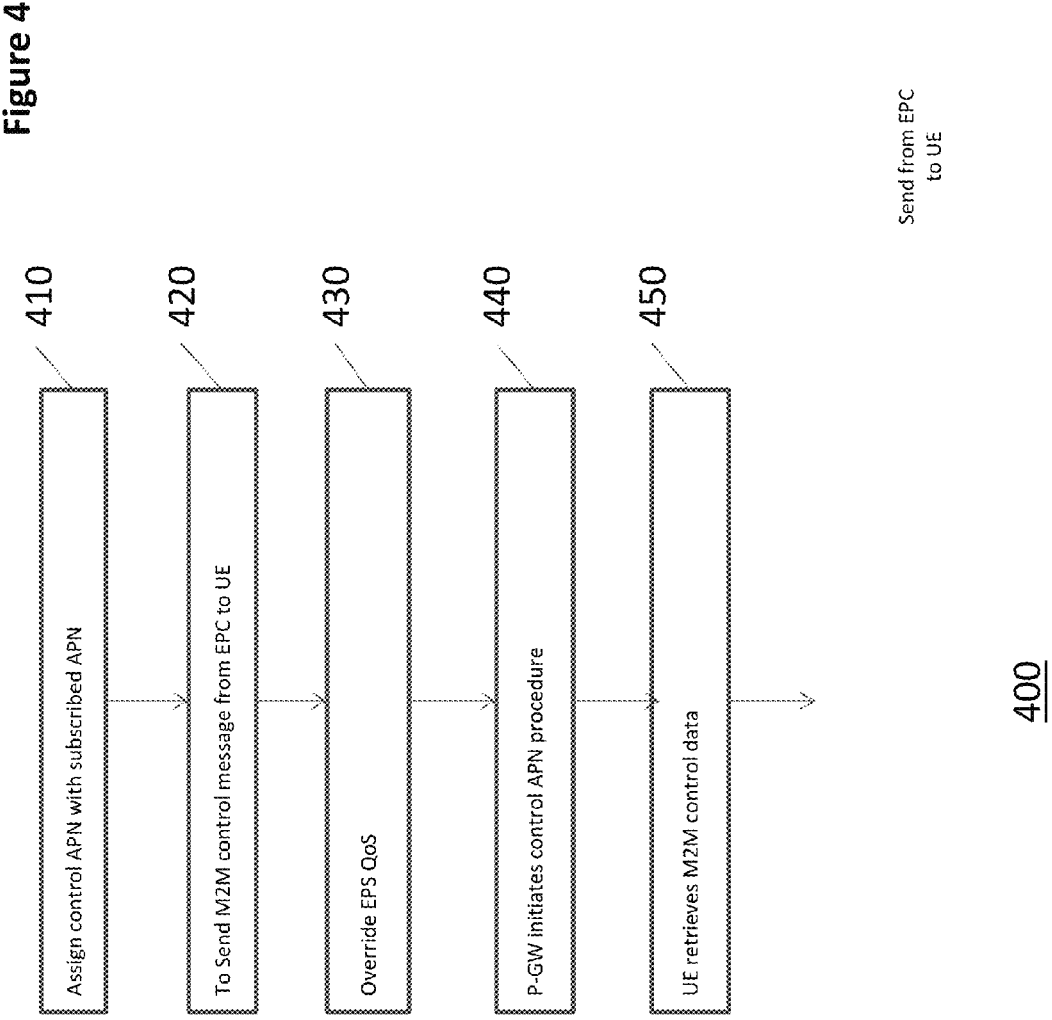

FIG. 4 sets forth one embodiment of the present invention providing for a method 400 for assigning a control Access Point Name (APN) in a machine-to-machine (M2M) network independent of user application level traffic, from the CORE to the UE. The method starts at 401 and may proceed in assigning a control APN and a subscribed APN at 410. As used here, a control APN is intended to be a special APM that is not used for user traffic but is specific for use in transmission and receipt of M2M control message(s) only. A control APN does not require a guaranteed maximum bit rate (GBR) default bearer and rather only utilizes a non-GBR default bearer. Further a control-APN does not require a dedicated bearer in operation.

Further, as used herein the term "M2M control data" or "M2M control messaging" is intended to mean data which traverses a device-to-network messaging scheme designed to control M2M device(s) for (1) network connection resource management, (2) device control command delivery, (3) periodic report (e.g. location info and signal strength) from the device, (4) event report triggered by pre-defined conditions at device, and (5) other non-user application level control data exchange. For clarity, M2M control messaging does not involve application level messaging, but may be triggered by request from customer's application on PDN. Examples of M2M control messaging include shoulder-tap, over-the-air-parameter-administration (OTAPA) operation, AerFrame MCF, vehicle-to-vehicle (V2V) control operation, etc.

Further from FIG. 4, following the assignment of 410, a procedure to send the M2M control message is set forth at 420. The methodology of the present invention of steps for sending the M2M control message are dependent on the first point of send and the second point of receipt. For instance, from FIG. 4, at 430, the first point of transmission of the M2M control message is from the EPC or CORE. FIG. 4 depicts steps of the present invention where the message is sent from the CORE to the user equipment or user entity (UE) (also understood as a device).

From FIG. 4, the M2M control data is prepared for sending by overriding one or more M2M quality of service (QoS) and traffic flow template (TFT) parameters at 430. Preferably, the step of preparing is performed by a Policy and Charging Rules Function application (PCRF).

As used herein, the term TFT is a set of all packet filters associated with an EPS bearer. A packet filter may be associated with a protocol. A packet filter Identifier shall be used to identify a packet filter, where several packet filters can be combined to form a Traffic Flow Template. As used herein the Bearer level QoS is associated with a bearer and all traffic mapped to that will receive same bearer level packet forwarding treatment. Bearer level QoS parameter values of the default bearer are assigned by the network based on the subscription data received from HSS.

In LTE the decision to establish or modify a dedicated bearer is taken by EPC and bearer level QoS parameters are assigned by EPC. These values "shall" not be modified by MME but are forwarded transparently to EUTRAN. However MME may reject the establishment of dedicated bearer if there is any discrepancy.

In a preferred embodiment, a Policy and Charging Rules Function (PCRF) may be deployed using the present invention. The PCRF is the software node designated in real-time to determine policy rules in a multimedia network. Typically the PCRF would be a controller, logic or software component that operates at the network core and accesses subscriber databases and other specialized functions, such as a charging system, in a centralized manner. Because it operates in real time, the PCRF has an increased strategic significance and broader potential role than traditional policy engines. The PCRF is the part of the network architecture that aggregates information to and from the network, operational support systems, and other sources (such as portals) in real time, supporting the creation of rules and then enables an automatic approach to making policy decisions for each subscriber active on the network. Preferably, the PCRF can also be integrated with different platforms like billing, rating, charging, and subscriber database or can also be deployed as a standalone entity. Preferably, in the present invention, a PCRF is used to provide a plurality of definition and assignment rules for executing the steps of defining and assigning.

Returning to FIG. 4, the step of overriding may be accomplished by one or more of: (i) operator specific QoS class identifier (QCI) values by 1 octet; (ii) maximum bit rate (MBR) by four octets, whereby two octets are per each uplink and each downlink; (iii) APN aggregate maximum bit rate (APN-AMBR) by six octets, whereby three octets are per each uplink and each downlink; and (iv) one or more TFT parameters by between three and two hundred fifty seven octets in relation to the number of included packet filters. In a preferred embodiment, a plurality of the above steps is undertaken. In a further preferred embodiment, each step (1) through (iv) is required.

From FIG. 4, at 440, a PDN gateway (P-GW) initiates a bearer modification procedure for the control APN with the PCRF and providing one or more QoS parameters. The QoS parameters are then received. Preferably, the procedure is one of a IP-CAN Session Modification as defined in 3GPP TS 23.203 (see http://www.3gpp.org/ftp/Specs/html-info/23203.htm) incorporated herein by reference.

At 450, the UE receives the M2M control data. As part of this step, upon receipt of the modify EPS bearer context request message from the MME associated with the control APN, the UE retrieves the M2M control data from the delivered QoS parameters. In this manner the assignment of a control APN with an M2M control message from the CORE to the UE, being independent of user application level traffic is achieved.

Figure 5:
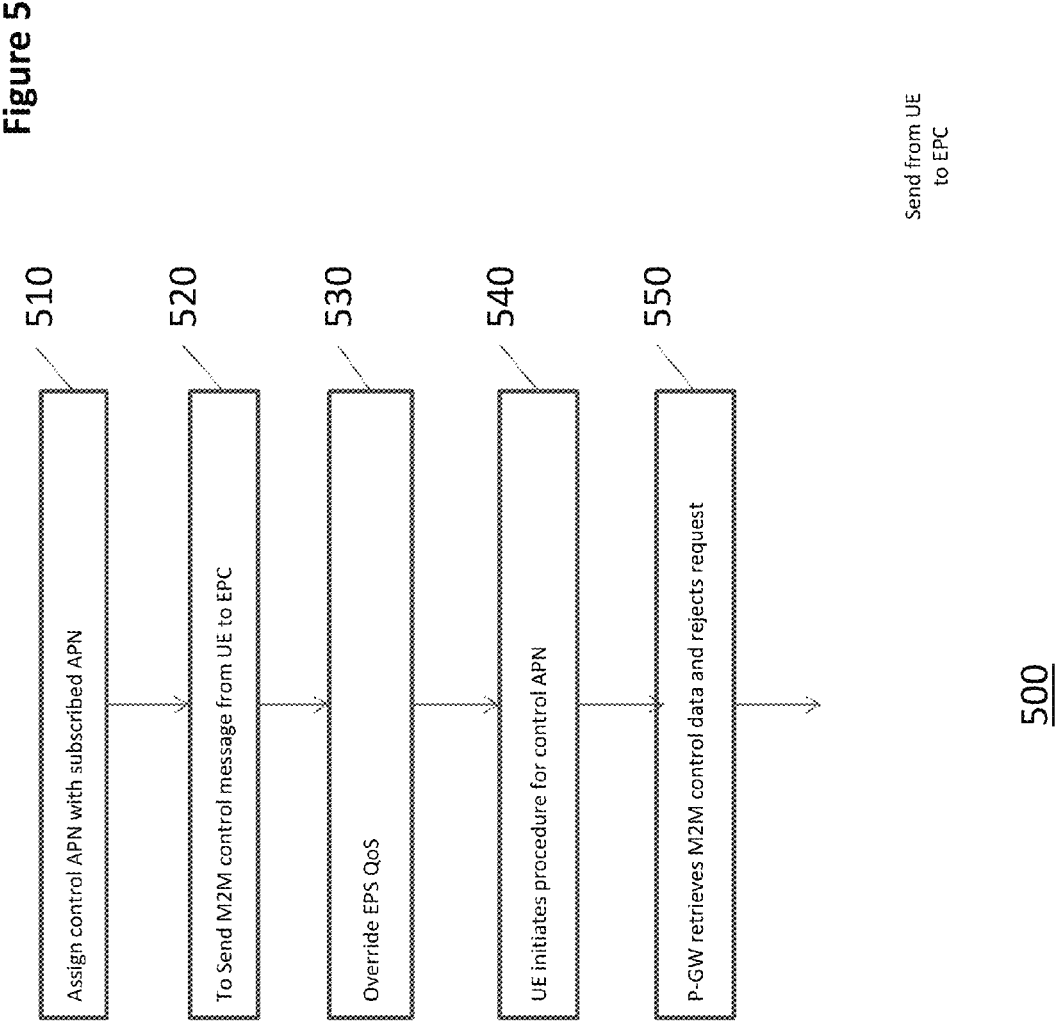
FIG. 5 sets forth one embodiment of the present invention providing for a method for assigning a control Access Point Name (APN) in a machine-to-machine (M2M) network independent of user application level traffic, from the UE to the CORE.

FIG. 5 sets forth one embodiment of the present invention providing for a method for assigning a control Access Point Name (APN) in a machine-to-machine (M2M) network independent of user application level traffic, from the UE to the CORE. Further from FIG. 5, following the assignment of 510, a procedure to send the M2M control message is set forth at 520. At 520, the M2M control message is from the UE. FIG. 5 depicts steps of the present invention where the message is sent from the UE to the CORE.

From FIG. 5, the M2M control data is prepared for sending by overriding one or more M2M quality of service (QoS) and traffic flow template (TFT) parameters at 530. For the present invention, the step of overriding includes overriding one or more of: (i) operator specific QoS class identifier (QCI) values by 1 octet; (ii) maximum bit rate (MBR) by four octets, whereby two octets are per each uplink and each downlink; (iii) guaranteed bit rate (GBR) by four octets, whereby two octets are per each uplink and each downlink; and (iv) one or more TFT parameters by between three and two hundred fifty seven octets in relation to the number of included packet filters. In a preferred embodiment, the step of overriding includes at least a plurality of (i), (ii), (iii), and (iv). In a further preferred embodiment, the step of overriding includes all of (i), (ii), (iii), and (iv).

At 540, the present invention provides for the UE initiating a bearer modification procedure for the control APN. At 550, the step of receiving further includes receiving a modify EPS bearer context request message, whereafter the PDN gateway (P-GW) and PCRF retrieve the M2M control data and reject the request message. In this manner the assignment of a control APN with an M2M control message from the UE to the CORE, being independent of user application level traffic is achieved.

Advantageously, the present invention in operation does not require a change in the network operations as only standard based bearer management procedures are incorporated; similarly, only M2M control data delivery occurs on the control plane such that there is no user plan traffic involved thereby being nearly transparent to the user applications; and, since non-GBR is utilized for the present invention for the control APN, there is no dedicated resource required. Additionally, it will be appreciated by those skilled in the art that a user of the present invention may also apply pre-defined set(s) of M2M control data and modify or extend such to suit specific applications requirements while remaining within the scope of the invention herein.

Additional utilization of the present invention is envisioned in one or more embodiments where the sources available for integration may be identified and associated with creating or identifying data streams to gather associated data from within the network.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims. Many other embodiments of the present invention are also envisioned.

In one or more preferred embodiments, servers and/or back-end servers may include Authentication, Authorization and Accounting (AAA) servers.

The term IMS is intended to mean the IP Multimedia Subsystem or IP Multimedia Core Network Subsystem (IMS) which is an architectural framework for delivering IP multimedia services. The term OTT or "over-the-top" generally refers to the delivery of content and services over an infrastructure that is not under the same administrative control as the content or service provider.

Further, the following references are incorporated herein by reference: 3GPP TS 23.203 (http://www.3gpp.org/ftp/Specs/html-info/23203.htm); 3GPP TS 29.212 (http://www.3gpp.org/ftp/Specs/html-info/29212.htm); 3GPP TS 24.301 (http://www.3gpp.org/ftp/Specs/html-info/24301.htm); and, 3GPP TS 23.401 (http://www.3gpp.org/ftp/Specs/html-info/23401.htm).

Any theory, mechanism of operation, proof, or finding stated herein is meant to further enhance understanding of the present invention and is not intended to make the present invention in any way dependent upon such theory, mechanism of operation, proof, or finding. It should be understood that while the use of the word preferable, preferably or preferred in the description above indicates that the feature so described may be more desirable, it nonetheless may not be necessary and embodiments lacking the same may be contemplated as within the scope of the invention, that scope being defined by the claims that follow.

What is claimed is:

1. A computer-implemented method utilized in a machine-to-machine (M2M) network, comprising the steps of:
   assigning a control Access Point Name (APN) along with a subscribed APN for a subscription profile;
   wherein the control APN is for use in transmission and receipt of M2M control messages and the subscribed APN is for user application level traffic; and
   sending the M2M control messages from a first network point to a second network point for the control APN; and
   receiving the M2M control messages at the second point.

2. The method of claim 1, wherein the first point is one of a core network (CORE) or a user equipment (UE).

3. The method of claim 1, wherein the second point is one of a core network (CORE) or a user equipment (UE).

4. The method of claim 1, wherein the control APN and the subscribed APN are assigned during the initial attachment to the M2M network and the default bearer is established between the first point and the second point.

5. The method of claim 1, wherein the first point is the CORE and the second point is the UE.

6. The method of claim 5, further comprising preparing the M2M control data for sending by overriding one or more M2M quality of service (QoS) and traffic flow template (TFT) parameters.

7. The method of claim 6, wherein the step of preparing is performed by a Policy and Charging Rules Function application (PCRF).

8. The method of claim 7, wherein the step of overriding includes overriding one or more of: (i) operator specific QoS class identifier (QCI) values by 1 octet; (ii) maximum bit rate (MBR) by four octets, whereby two octets are per each uplink and each downlink; (iii) APN aggregate maximum bit rate (APN-AMBR) by six octets, whereby three octets are per each uplink and each downlink; and (iv) one or more TFT parameters by between three and two hundred fifty seven octets in relation to the number of included packet filters.

9. The method of claim 8, wherein the step of overriding includes at least a plurality of (i), (ii), (iii), and (iv).

10. The method of claim 9, further comprising a PDN gateway (P-GW) initiating a bearer modification procedure for the control APN with the PCRF and providing one or more QoS parameters.

11. The method of claim 10, wherein the step of receiving further includes receiving a modify EPS bearer context request message from a mobility management entity (MME) associated with the control APN and the QoS parameters.

12. The method of claim 11, wherein the step of receiving further includes the UE retrieving the M2M control data from the provided QoS parameters.

13. The method of claim 5, wherein the first point is the UE and the second point is the CORE.

14. The method of claim 13, further comprising preparing the M2M control data for sending by overriding one or more M2M quality of service (QoS) and traffic flow template (TFT) parameters.

15. The method of claim 14, wherein the step of overriding includes overriding one or more of: (i) operator specific QoS class identifier (QCI) values by 1 octet; (ii) maximum bit rate (MBR) by four octets, whereby two octets are per each uplink and each downlink; (iii) guaranteed bit rate (GBR) by four octets, whereby two octets are per each uplink and each downlink; and (iv) one or more TFT parameters by between three and two hundred fifty seven octets in relation to the number of included packet filters.

16. The method of claim 15, wherein the step of overriding includes at least a plurality of (i), (ii), (iii), and (iv).

17. The method of claim 16, further comprising the UE initiating a bearer modification procedure for the control APN.

18. The method of claim 17, wherein the step of receiving further includes receiving a modify EPS bearer context request message, whereafter the PDN gateway (P-GW) and PCRF retrieve the M2M control data and reject the request message.

19. A computer program product stored on a non-transitory computer usable medium, comprising: computer readable program means for causing a computer to control an execution of an application to perform a computer-implemented method utilized in a machine-to-machine (M2M) network, comprising the steps of:
assigning a control Access Point Name (APN) along with a subscribed APN for a subscription profile; and
sending the M2M control messages in a first instance from either a user equipment (UE) point to a core network (CORE) or from a CORE to a UE for the control APN; and
retrieving the sent M2M control messages.

20. The program product of claim 19, wherein the control APN and the subscribed APN are assigned during the initial attachment to the M2M network and the default bearer is established between the first point and the second point.

21. The program product of claim 20, further comprising preparing the M2M control data for sending by overriding one or more M2M quality of service (QoS) and traffic flow template (TFT) parameters, where the M2M control data is to be sent from the CORE to the UE.

22. The program product of claim 21, further comprising a Policy and Charging Rules Function application (PCRF).

23. The program product of claim 22, wherein the step of preparing is performed by the PCRF.

24. The program product of claim 23, wherein the step of overriding includes overriding one or more of: (i) operator specific QoS class identifier (QCI) values by 1 octet; (ii) maximum bit rate (MBR) by four octets, whereby two octets are per each uplink and each downlink; (iii) APN aggregate maximum bit rate (APN-AMBR) by six octets, whereby three octets are per each uplink and each downlink; and (iv) one or more TFT parameters by between three and two hundred fifty seven octets in relation to the number of included packet filters; and further comprises communication with a PDN gateway (P-GW) for initiating a bearer modification procedure for the control APN with the PCRF and providing one or more QoS parameters.

25. The program product of claim 24, wherein the step of receiving further includes receiving a modify EPS bearer context request message from a mobility management entity (MME) associated with the control APN and the QoS parameters and the UE retrieving the M2M control data from the provided QoS parameters.

26. The program product of claim 20, further comprising preparing the M2M control data for sending by overriding one or more M2M quality of service (QoS) and traffic flow template (TFT) parameters, where the M2M control data is to be sent from the UE to the CORE.

27. The program product of claim 26, wherein the step of overriding includes overriding one or more of: (i) operator specific QoS class identifier (QCI) values by 1 octet; (ii) maximum bit rate (MBR) by four octets, whereby two octets are per each uplink and each downlink; (iii) guaranteed bit rate (GBR) by four octets, whereby two octets are per each uplink and each downlink; and (iv) one or more TFT parameters by between three and two hundred fifty seven octets in relation to the number of included packet filters; and further comprising the UE initiating a bearer modification procedure for the control APN.

28. The program product of claim 27, wherein the step of receiving further includes receiving a modify EPS bearer context request message, whereafter the PDN gateway (P-GW) and PCRF retrieve the M2M control data and reject the request message.

29. The program product of claim 20, including a plurality of devices each having one or more APNs.

* * * * *